United States Patent
Kimura et al.

(10) Patent No.: US 6,523,094 B2
(45) Date of Patent: *Feb. 18, 2003

(54) PORTABLE INFORMATION PROCESSING TERMINAL DEVICE WITH LOW POWER CONSUMPTION AND LARGE MEMORY CAPACITY

(75) Inventors: Tetsuro Kimura, Tokyo (JP); Tetsuro Muranaga, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/178,563

(22) Filed: Jun. 25, 2002

(65) Prior Publication Data

US 2002/0169928 A1 Nov. 14, 2002

Related U.S. Application Data

(63) Continuation of application No. 09/664,358, filed on Sep. 18, 2000, now Pat. No. 6,415,359.

(30) Foreign Application Priority Data

Sep. 30, 1999 (JP) .......................................... 11-278260

(51) Int. Cl.⁷ ............................................... G06F 12/02
(52) U.S. Cl. ...................... 711/137; 711/113; 711/163; 711/118; 713/324
(58) Field of Search ................................ 711/137, 113, 711/163, 118; 713/324

(56) References Cited

U.S. PATENT DOCUMENTS 6,415,359 B1 * 7/2002 Kimura et al. ............... 711/137

* cited by examiner

Primary Examiner—Hiep T. Nguyen
(74) Attorney, Agent, or Firm—Oblon, Spivak, McClelland, Maier & Neustadt, P.C.

(57) ABSTRACT

A portable information processing terminal device, realizing both a low power consumption and a large memory capacity, is formed by a first memory for storing files, a second memory for storing a plurality of files, the second memory having a larger memory capacity and a higher power consumption than the first memory, a processing unit configured to read and process files stored in the first memory, and to access the second memory when a desired file does not exist in the first memory, a judgement unit configured to judge whether there is a possibility of external power supply or not, a prohibition unit configured to prohibit activation of the second memory when the judging unit judges that there is no possibility of external power supply, and a control unit configured to select prescribed files that are expected to have probabilities for being accessed during a period in which activation of the second memory is prohibited by the prohibition unit, and to store the prescribed files into the first memory in advance.

1 Claim, 10 Drawing Sheets

| FILE NAME | STORED LOCATION | UPDATE INFORMATION | LAST ACCESS TIME | ACCESS MODE |
|---|---|---|---|---|
| /program/prog1 | 1 | UNCHANGED | 1999/7/2 13:45 | read only |
| /data/data1 | 2 | MODIFIED | 1999/8/30 8:45 | read write |
| /data/data2 | - | - | - | - |
| /dir1/dir2/* | - | - | - | - |

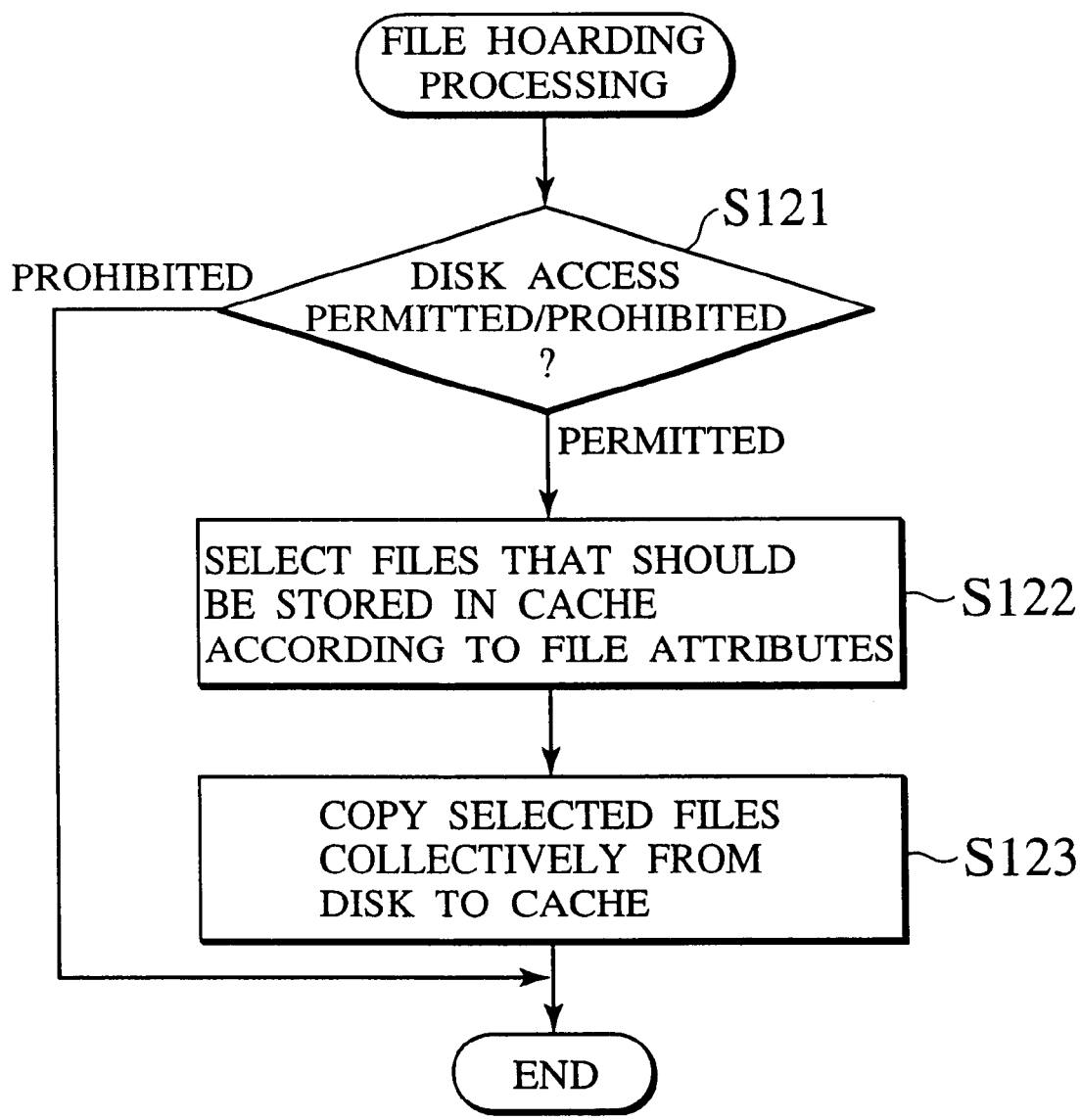

PORTABLE INFORMATION PROCESSING TERMINAL DEVICE WITH LOW POWER CONSUMPTION AND LARGE MEMORY CAPACITY

BACKGROUND OF THE INVENTION

1. Field of the Invention

The present invention relates to a portable information processing terminal device such as PDA (Personal Digital (Data) Assistants) for example, and its file management method, with improvement for realizing both a low power consumption and a large memory capacity.

2. Description of the Background Art

In recent years, computers are becoming more compact and light due to the advance of the semiconductor technology, so that various handy portable information processing terminal devices have been developed as exemplified by PDA and palm-top PC. In such a compact portable information processing terminal, it has been customary to provide only a semiconductor memory as a secondary storage for storing files, without providing any large capacity memory device such as hard disk, due to limitations on its size, weight, continuously operable time using a battery, etc.

However, the number and size of files utilized by users are steadily increasing recently so much so that there are increasing demands for implementing a large capacity memory device such as hard disk on the portable information processing terminal in order to store these files.

But the hard disk has a very large power consumption because of its driving system including a motor and a head, even though its memory capacity is very large. For this reason, the portable information processing terminal that is often used in a battery driven mode will have a problem if the hard disk is implemented on it because the continuously operable time using a battery would be shortened considerably. On the other hand, if a large capacity battery is implemented in order to extend the continuously operable time using a battery, the size and weight of the terminal would be increased to such an extent as to hamper the portability of the terminal.

SUMMARY OF THE INVENTION

It is therefore an object of the present invention to provide a portable information processing terminal device and its file management method capable of providing a sufficient data memory capacity without hampering the portability by realizing both a low power consumption and a large memory capacity.

According to one aspect of the present invention there is provided an information processing terminal device, comprising: a first memory for storing files; a second memory for storing a plurality of files, the second memory having a larger memory capacity and a higher power consumption than the first memory; a processing unit configured to read and process files stored in the first memory, and to access the second memory when a desired file does not exist in the first memory; a judgement unit configured to judge whether there is a possibility of external power supply or not; a prohibition unit configured to prohibit activation of the second memory when the judging unit judges that there is no possibility of external power supply; and a control unit configured to select prescribed files that are expected to have probabilities for being accessed during a period in which activation of the second memory is prohibited by the prohibition unit, and to store the prescribed files into the first memory in advance.

According to another aspect of the present invention there is provided a file management method for managing files of an information processing terminal device having a first memory for storing files and a second memory for storing a plurality of files, the second memory having a larger memory capacity and a higher power consumption than the first memory, the file management method comprising the steps of: judging whether there is a possibility of external power supply or not; prohibiting activation of the second memory when the Judging step Judges that there is no possibility of external power supply; and selecting prescribed files that are expected to have probabilities for being accessed during a period in which activation of the second memory is prohibited by the prohibiting step, and storing the prescribed files into the first memory in advance.

According to another aspect of the present invention there is provided a computer usable medium having computer readable program codes embodied therein for causing a computer to function as a file management method for managing files of an information processing terminal device having a first memory for storing files and a second memory for storing a plurality of files, the second memory having a larger memory capacity and a higher power consumption than the first memory, the computer readable program codes include: a first computer readable program code for causing said computer to judge whether there is a possibility of external power supply or not; a second computer readable program code for causing said computer to prohibit activation of the second memory when the first computer readable program code Judges that there is no possibility of external power supply: and a third computer readable program code for causing said computer to select prescribed files that are expected to have probabilities for being accessed during a period in which activation of the second memory is prohibited by the second computer readable program code, and to store the prescribed files into the first memory in advance.

Other features and advantages of the present invention will become apparent from the following description taken in conjunction with the accompanying drawings.

BRIEF DESCRIPTION OF THE DRAWINGS

FIG. 12 is a flow chart showing a procedure of a file hoarding processing to be carried out by a file system the portable information processing terminal device of FIG. 1.

DETAILED DESCRIPTION OF THE PREFERRED EMBODIMENTS

Referring now to FIG. 1 to FIG. 12, one embodiment of a portable information processing terminal device according to the present invention will be described in detail.

Figure 1:
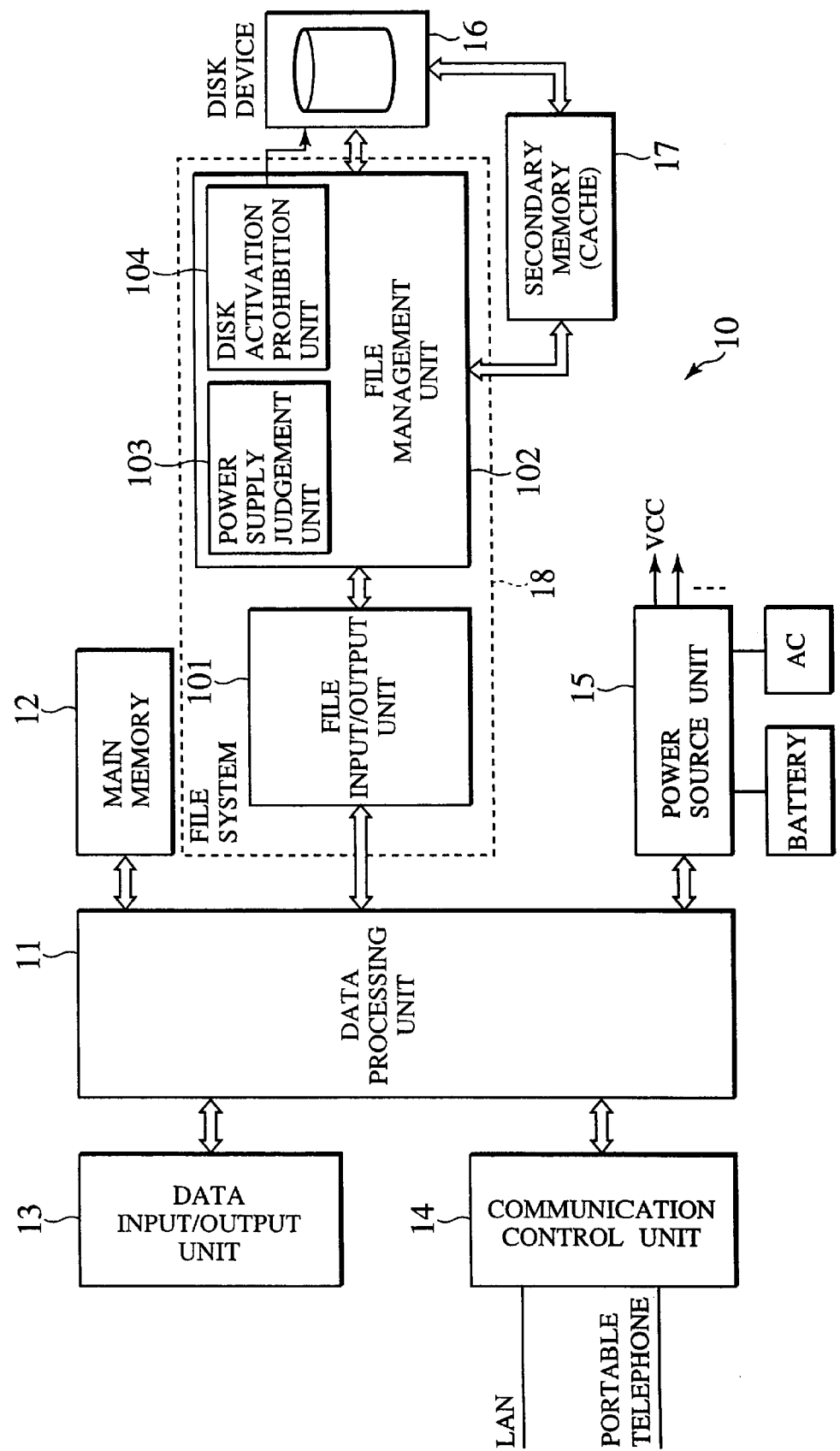
FIG. 1 is a block diagram showing an exemplary configuration of a portable information processing terminal device according to one embodiment of the present invention.

FIG. 1 shows an exemplary configuration of a portable information processing terminal device according to this embodiment.

This portable information processing terminal device 10 is a portable computer that can be driven by a battery similar to what is known as PDA or palm-top PC, and includes a data processing unit 11, a main memory 12, a data input/output unit 13, a communication control unit 14, a power source unit 15, a disk device 16, and a secondary memory 17. In addition, this portable information processing terminal device 10 is implemented with a file system 18 having a control function for suppressing the power consumption by the disk device 16.

This file system 18 is realized by a software for managing files used in the portable information processing terminal device 10, which comprises a file input/output unit 101 for carrying out input/output of files with respect to the data processing unit 11, and a file management unit 102 for managing files stored in the disk device 16 and the secondary memory 17, By utilizing this file system 18, it becomes possible to realize a control by which an activation of the disk device 16 is prohibited and a processing is carried out using only files within the secondary memory 17 under circumstances in which it is desirable to reduce the power consumption as in the case where a user of the portable information processing terminal device 10 is moving or located at a visited site.

Both the disk device 16 and the secondary memory 17 function as a secondary storage of this portable information processing terminal device 10, and are used for storing program files and data files managed by the file system 18. The disk device 16 is a large capacity memory device having a mechanical driving unit such as a hard disk device, and has a memory capacity of several hundreds of Mbytes to several tens of Gbytes. This disk device 16 stores application programs to be executed on this portable information processing terminal device 10 and data files to be handled by these application programs. In addition, the disk device 16 can be used for storing various files and may store application programs and data files that can be executed/processed only by other information processing devices which are platforms different from this portable information processing terminal device 10, for example.

On the other hand, the secondary memory 17 is formed by a semiconductor memory and has a memory capacity smaller than that of the disk device 16. This secondary memory 17 may be a memory that functions as a cache of the disk device 16, or a memory that is utilized as an independent secondary storage device for storing files that are not present on the disk device 16. In this embodiment, the secondary memory 17 will be utilized basically for storing files having high probabilities for being used by a user under circumstances such as those in which a user of the portable information processing terminal device 10 is moving or located at a visited site.

The data processing unit 11 has a function for reading out necessary files from the disk device 16 or the secondary memory 17 onto the main memory 12 and processing them, and is realized by a CPU and a software such as operating system that is executed by the CPU. This data processing unit 11 accesses the disk device 16 when a desired processing target file cannot be found in the secondary memory 17. Accesses to the disk device 16 and the secondary memory 17 by this data processing unit are carried out via the file system 18.

The operating system and the file system 18 are basically executed by the CPU in a state of being permanently stationed in the main memory 12 during the operation of the information processing terminal device 10. Consequently, these operating system and file system 18 can be stored in either one of the disk device 16 and the secondary memory 17. However, in order to enable system activation/re-activation even in a state where activation of the disk device 16 is prohibited, it is preferable to record these operating system and file system 18 in the secondary memory 17 or another dedicated memory device such as ROM. Alternatively, it is possible to use a setting in which activation of the disk device 16 is unconditionally permitted at a time of system activation/re-activation. In this case, the operating system and the file system 18 may be recorded on the disk device 16.

The data input/output unit 13 is formed by input/output devices such as keyboard, display, etc., that are used for the purpose of data input/output with respect to the user.

The communication control unit 14 is provided for the purpose of exchanging information with various types of other information processing devices by connecting this portable information processing terminal device 10 to a network, and has an interface for LAN connection and an interface for connection to a public network or the like through a portable telephone or the like. The communication control unit 14 may also have an interface for one-to-one communications through a direct connection with another information processing device such as communications using IrDA or the like.

The power source unit 15 supplies operation power to each unit of the portable information processing terminal device 10 by using a battery (electric cell) and an external AC power source. When the portable information processing terminal device 10 is connected to the external AC power source, the power source unit 15 generates the operation power by using the external AC power source while also charging the battery (electric cell). When the portable information processing terminal device 10 is not connected to the external AC power source, the power source unit 15 generates the operation power by using the battery.

Manner of Utilization

A user (an owner or a user, strictly speaking) of this portable information processing terminal device 10 can use this portable information processing terminal device 10 in isolation or in coordination with other information devices. In the case of using it in isolation, the user carries out his/her work by using application programs managed by the file system 18 of the portable information processing terminal device 10. The application program also refers to document files or data files managed by the file system of the portable information processing terminal device 10.

In addition, the user can use the portable information processing terminal device 10 in coordination with the other information devices. The portable information processing terminal device 10 is provided with the communication control unit 14 as mentioned above, and can carry out communications such as exchanges of files with the other information processing devices by using the communication control unit 14. More specifically, by connecting with an external PC or the like through a network, a file supply service or a file storing service is provided with respect to the PC. Using this function, the user can access and process files in the portable information processing terminal device 10 from the PC, and store updated data back into the portable information processing terminal device 10.

Power Source

As mentioned above, the portable information processing terminal device 10 is implemented with the battery, and operated in a battery driven mode while the user is moving. When the portable information processing terminal device 10 is used at the user's own desk in his/her office, the portable information processing terminal device 10 is operated by connecting it to the external AC power source through a cable or the like, so as to save a remaining power of the battery or to charge the battery.

In the case of using the portable information processing terminal device 10 in the battery driven mode, activation of the disk device 16 which has a large power consumption should be avoided as much as possible in order to extend the battery driven operation time as much as possible. To this end, in this embodiment, a group of files that are expected to be necessary during the battery driven operation are copied from the disk device 16 to the secondary memory 17 in advance, and the file reading/writing is carried out by using only the secondary memory 17 without activating the disk device 16 during the battery driven operation. For this reason, the file management unit 102 is provided with a power supply judgement unit 103 and a disk activation prohibition unit 104.

The power supply judgement unit 103 provides a function for judging whether there is a possibility of external power supply or not, and a function for detecting a remaining power of the battery through the power source unit 15. The judgement as to whether there is a possibility of external power supply or not does not necessarily completely agree with the actual possibility such as whether the external AC power source is actually connected or not, and can be made by prescribed criteria according to the utilization environment or the like of this portable information processing terminal device 10. The specific procedure for this judgement will be described below with reference to FIG. 3.

The disk activation prohibition unit 104 prohibits activation of the disk device 16 in the case where the power supply judgement unit 103 judges that there is no possibility of external power supply. The prohibition of activation of the disk device 16 can be realized by: (1) a method of turning off the power of the disk device 16 by stopping supply of operation power from the power source unit 15 to the disk device 16; or (2) a method of stopping only rotations of a motor while keeping the power of the disk device 16 on. It is also possible to use (3) a method of totally prohibiting any issue of access request with respect to the disk device 16 and maintaining the disk device 16 in a standby state, even though this method has an inferior power consumption lowering effect compared with the methods (1) and (2). Even in this case, it is possible to effectively prohibit the operation of the mechanical driving mechanism such as a head of the disk device 16.

Files to be Cached

Those files which have high probabilities of being accessed during a period of the battery driven mode are read into the secondary memory 17 in advance by the file system 18 while activation of the disk device 16 is not prohibited. The secondary memory 17 has a severe limitation on its capacity so that it is important to read those files with higher probability of being accessed a period of during the battery driven mode into the secondary memory 17 at higher priority.

For this reason, it is preferable to assign a priority level to each file and set higher priority levels to those files that should be read into the secondary memory 17 in advance. This priority level will be utilized not only in selecting files to be read into the secondary memory 17 from files stored in the disk device 16 when there is a vacant region in the secondary memory 17, but also in selecting files to be deleted from files in the secondary memory 17 in order to secure a vacant region in the secondary memory 17.

As for those application programs that are executable only on platforms other than this portable information processing terminal device 10, they cannot be executed on this portable information processing terminal device 10 even if they were read from the disk device 16 into the secondary memory 17. Consequently the files having high probabilities for being accessed during a period of the battery driven mode, i.e., files for which high priority levels should be set, include application programs that are executable on this portable information processing terminal device 10, library files that are necessary in executing these application programs, various setting files of these application programs, data files that can be processed by these application programs, etc., for example. These are files for this portable information processing terminal device 10 that can be used by this portable information processing terminal device 10 in isolation so that they have very high probabilities of being accessed during a period of the battery driven mode.

Also, the secondary memory 17 can be used as a secondary storage independent from the disk device 16 so that there can be some application program files that are stored only in the secondary memory 17 and not in the disk device 16. In such cases, files that can be processed by these application programs that are existing only in the secondary memory 17 should preferably be selected from a group of files stored in the disk device 16 and read into the secondary memory 17 in advance.

Whether it is an application program file that is executable on this portable information processing terminal device 10 or not and whether it is a file that can be processed by that application program or not can be judged according to file attributes of each file. As file attributes, it is possible to utilize an extension, a file name, an ID information of user data/system data, an ID information of program file/data file, etc., and it is also possible to attach to each file a dedicated ID information for explicitly identifying a file type and use this ID information as a file attribute in the judgement.

It is also possible to use a method in which the user explicitly specifies those files that the user wishes to read into the secondary memory 17 at higher priority. In this case, an ID information having a high priority level will be attached to files explicitly specified by the user as a file attribute.

It is also possible to judge whether it is a file that can be used on this portable information processing terminal device 10 from file data (especially a top portion called magic number).

It is also possible to determine the priority level according to a log of accesses to each file and set a high priority level to those files which have high utilization frequencies or those files which were used recently.

In the case where this portable information processing terminal device 10 is used in coordination with an information device such as a portable telephone or an electronic pocketbook that is carried by the user along with this portable information processing terminal device 10 through Bluetooth, IrDA or the like, there is a high probability for having a file access request issued from that information device during the battery driven mode. For this reason, it is preferable to store those files that can be accessed by that information device into a cache even if they cannot be processed on this portable information processing terminal device 10. Consequently, a high priority level may be set to files for a desired information device regardless of whether they can be processed on this portable information processing terminal device 10 or not.

File Management Unit

Figures 2, 3:
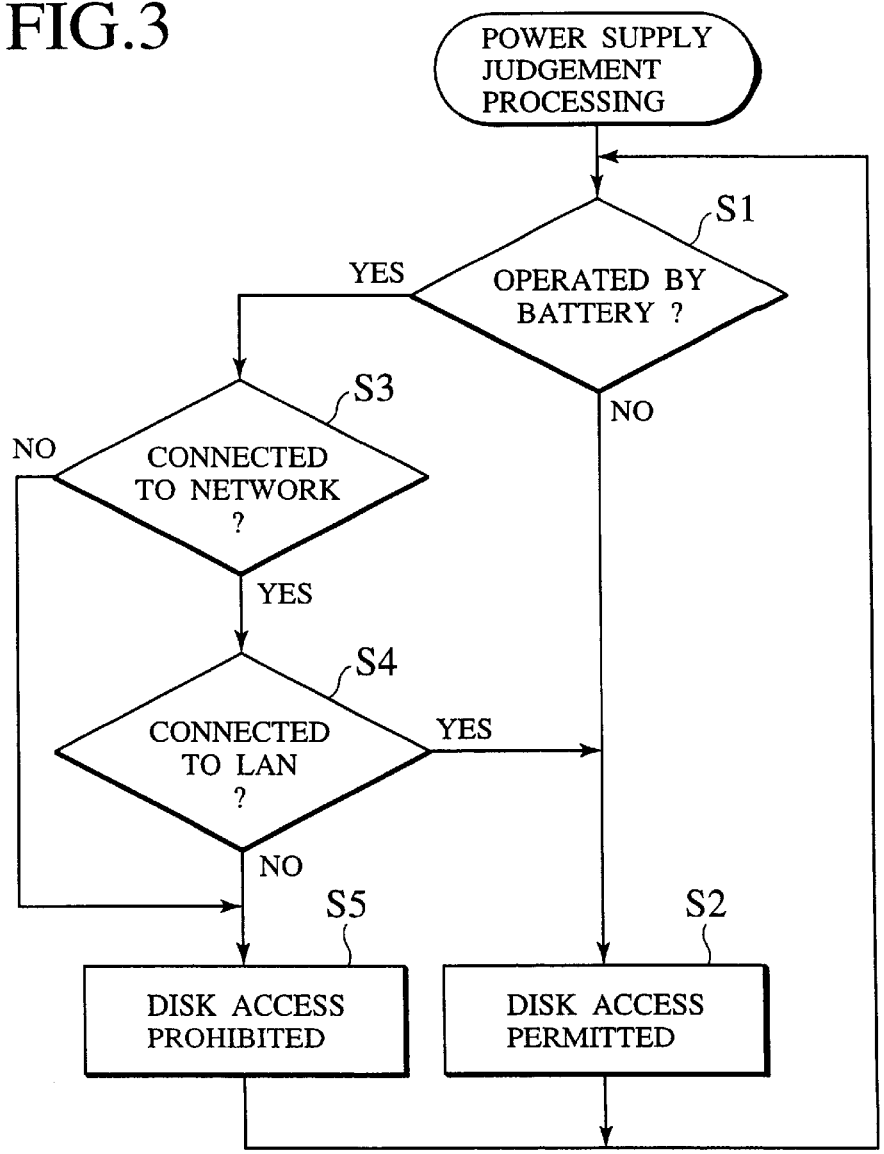
FIG. 2 is a diagram showing an exemplary configuration of a cache management table used in the portable information processing terminal device of FIG. 1.
FIG. 3 is a flow chart showing a procedure of a power supply judgement processing to be carried by a file system in the portable information processing terminal device of FIG. 1.

The file management unit 102 manages information such as a file name, a storing location in the secondary memory 17, an update information, a last access time, etc., using a cache management table as shown in FIG. 2, in order to manage files stored in the secondary memory 17. In addition, the file management unit 102 can maintain the management information in the cache management table not only for those files that are existing in the secondary memory 17 but also those files that are existing only in the disk device 16. This provision can be utilized when a file to which an access request is made during a period of the disk access prohibited state cannot be found in the secondary memory 17, in distinguishing a case where this is a file that is present in the disk device 16 and a case where this is an access request to non-existent file.

Also, the cache management table can be huge if an entry for every file is provided in the cache management table, so that when files are managed using a hierarchical directory structure, it is possible to collectively manage those files that are placed in lower hierarchical levels than some directory. In this case, however, if there is an access request to a file that does not exist under this directory, whether this file exists or not cannot be judged from the cache management table.

FIG. 2 shows an exemplary case of managing information for three files. FIG. 2 indicates that "/program/prog1/" is stored at a storing location "1" in the secondary memory 17, the update information of this file is "unchanged" implying that the file content is the same in the disk device 16 and the secondary memory 17, the last access time (or a file creation date and time) of this file is "1999/7/2 13:45", and the access mode of this file is "read only". FIG. 2 also indicates that "/data/data1" is stored at a storing location "2" in the secondary memory 17, the update information of this file is "modified" implying that the file in the secondary memory 17 alone is updated so that either the write back to the disk is necessary in future or this file is in a state of existing only in the secondary memory 17 (there is no original file in the disk device). FIG. 2 also indicates that "/data/data2" is stored at a storing position "−", i.e., it is not in the secondary memory 17 and stored only in the disk device 16. In FIG. 2, "/dir1/dir2/*" indicates that all files placed below this directory are not stored in the secondary memory 17.

Power Supply Judgement Processing

Next, with reference to FIG. 3, the processing for judging whether there is a possibility of external power supply or not will be described.

The power supply judgement unit 103 first Judges whether it is operated by the battery or not through the power source unit 15 (step S1). This judgement operation can be realized by regularly polling the power source unit 15 or by using an interruption signal from the power source unit 15. In the case where the external AC power source is connected to the portable information processing terminal device 10 and the portable information processing terminal device 10 is operated by that external AC power source (step S1 NO), the power supply Judgement unit 103 judges that "there is a possibility of external power supply" as the power is actually supplied from the external AC power source, and sets the disk device 16 in a disk access permitted state, while suspending the function of the disk activation prohibition unit 104 (step S2).

On the other hand, in the case where the external AC power source is not connected to the portable information processing terminal device 10 and the portable information processing terminal device 10 is operated by the battery (step S1 YES), the power supply judgement unit 103 basically judges that "there is no possibility of external power supply". However, in this embodiment, under specific environments, it can be Judged that "there is a possibility of external power supply" even when the external AC power source is not connected to the portable information processing terminal device 10, according to the following procedure.

Namely, in the case where the external AC power source is not connected, the power supply judgement unit 103 judges whether the portable information processing terminal device 10 is connected to a network or not (step S3). In the case where the portable information processing terminal device 10 is connected to a network (step S3 YES), the power supply judgement unit 103 further checks a type of communication channel currently used for the network connection (whether it is a LAN connection or a dial-up connection to a network using a portable telephone), in order to estimate whether it is an environment under which the external AC power source can be used.

In the case where the portable information processing terminal device 10 is connected to a LAN (step S4 YES), it is highly likely that the portable information processing terminal device 10 is used under an environment of an office or the like in which the external AC power source can be connected, so that the power supply judgement unit 103 judges that "there is a possibility of external power supply" and sets the disk device 16 in a disk access permitted state, while suspending the function of the disk activation prohibition unit 104 (step S2). In the case where it is the dial-up connection to a network using a portable telephone and not the LAN connection (step S4 NO), it is highly likely that the portable information processing terminal device 10 is used under a mobile environment in which the external AC power source cannot be used, so that the power supply judgement unit 103 judges that "there is no possibility of external power supply" and sets the disk device 16 in a disk access prohibited state by prohibiting activation of the disk device 16 using the disk activation prohibition unit 104 (step S5).

Also, in the case where the channel type is Bluetooth or IrDA, it is possible to identify a correspondent and judge that "there is no possibility of external power supply" if the correspondent is an electronic pocketbook or a portable telephone itself (the case where the portable information processing terminal device 10 is directly communicating with the correspondent, which is distinct from the case of a dial-up connection through a telephone). It is also possible to judge that "there is a possibility of external power supply" if the correspondent is a PC, a workstation, or the like. Else, it is also possible to identify the correspondent regardless of the channel type and make a judgement such that the judgement of presence/absence of a possibility of external power supply is different for different correspondents.

Note that, in the case of a device which has no interface for a portable telephone and which can only make a LAN connection, it is also possible to judge that "there is a possibility of external power supply" at a time of detecting the network connection.

File Reading/Writing Processing

In the following, the operations in the case of file reading and the case of file writing will be described separately. Note that the secondary memory 17 will be referred to as a cache in the following description, for the sake of convenience.

Reading on the Portable Information Processing Terminal Device

When an operation to activate an application on the portable information processing terminal device 10 is made, the operating system (OS) of the portable information processing terminal device 10 reads and activates an execution file of the requested application through the file system 18. At this point, upon receiving the file reading request, the file management unit 102 searches through the cache 17 by referring to the cache management table first, and when this file is in the cache 17 this file is read out from the cache 17 (steps S11, S12).

Then, the file management unit 102 judges whether it is in the disk access permitted state or the disk access prohibited state (step S13). When activation of the disk device 16 is not prohibited by the disk activation prohibition unit 104 so that it is in the disk access permitted state, the file management unit 102 checks the update information of the cache management table, and judges whether the reading requested file in the cache 17 is updated or not (step S14). If it is updated (step S14 YES), the file management unit 102 writes this file back to the disk device 16 (step S15). This write back processing may also be carried out in the case where an original file does not exist in the disk device 16.

Finally, the file management unit 102 updates relevant fields (storing location, update information, last access time, etc.) of the cache management table according to the need (step S16).

In the case where the reading requested file cannot be found in the cache 17 (step S11 NO), the file management unit 102 judges whether it is in the disk access permitted state or the disk access prohibited state (step S17). When activation of the disk device 16 is not prohibited by the disk activation prohibition unit 104 so that it is in the disk access permitted state, the file management unit 102 checks whether the reading requested file exists in the disk device 16 or not (step S18). In the case where the corresponding file does not exist in the disk device 16 or the disk access is prohibited, the file management unit 102 returns an error (step S23) and the processing is terminated.

In the case where the disk access is permitted and the corresponding file exists in the disk device 16, the file management unit 102 reads out that file from the disk device 16 to the main memory 12 and makes a preparation for the application execution (step S19). At this point, a copy of this file may be stored into the cache 17 if there is a sufficient vacant capacity in the cache 17 (steps S20, S22). In this case, the attribute information of the file read out from the disk device 16 is checked, and a copy of the file is created in the cache 17 only when this file is a file which has a high probability of being accessed during a period of the disk access prohibited state such as a period of the battery driven mode. In addition, even in the case where a vacant capacity is insufficient, this file can be stored after securing a sufficient vacant space by searching out and deleting files that are not accessed recently or the like (steps S20, S21, S22).

Finally, the file management unit 102 updates relevant fields (storing location, update information, last access time, etc.) of the cache management table according to the need (step S16), and the processing is terminated.

Note that, even in the case where the disk access is prohibited, if the reading request file exists only on the disk device 16, it is possible to permit the disk access by temporarily judging that there is a possibility of external power supply. The exemplary processing procedure in this case is shown in FIG. 5.

Figure 4:
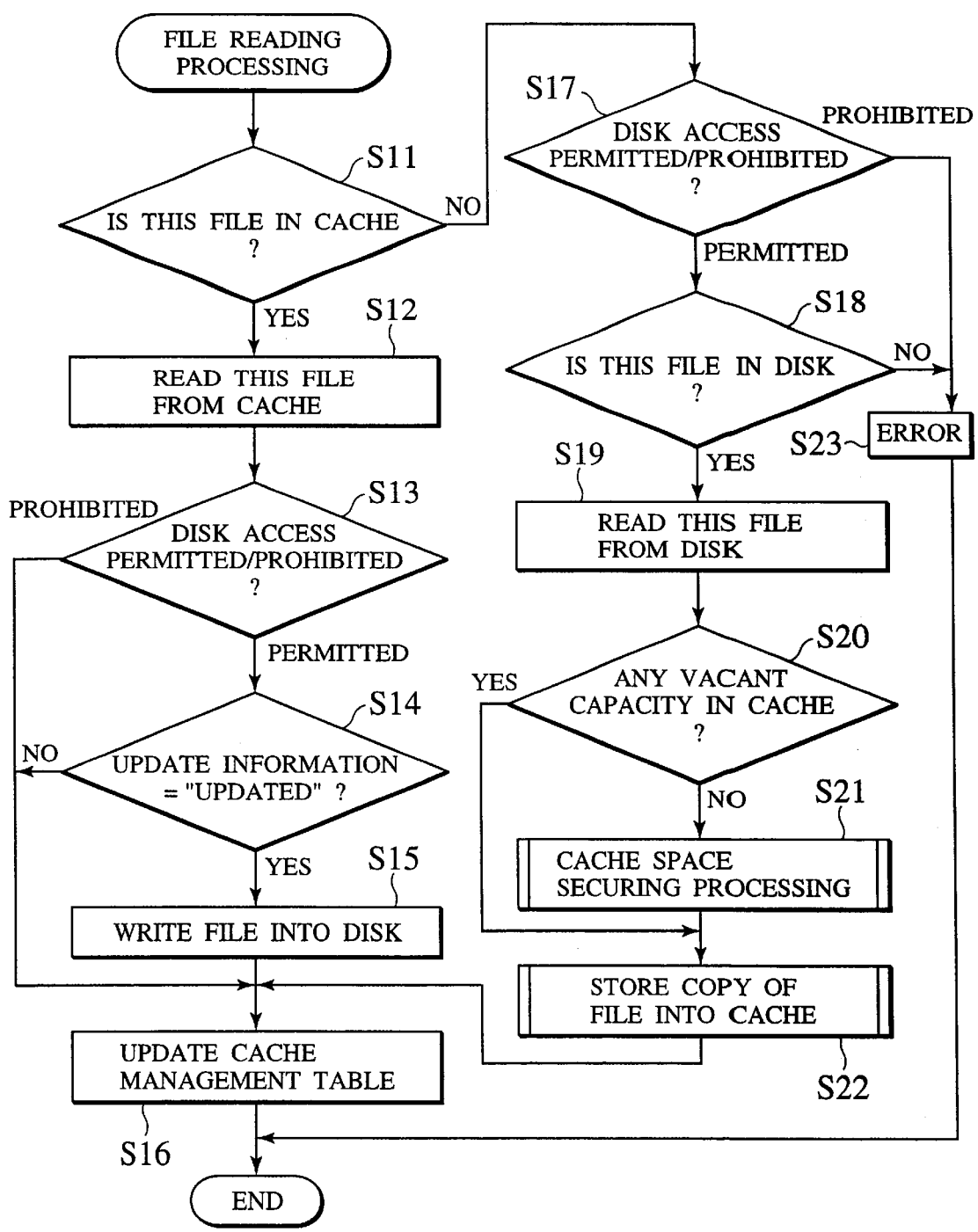
FIG. 4 is a flow chart showing one exemplary procedure of a file reading processing to be carried out by a file system of the portable information processing terminal device of FIG. 1.
Figure 5:
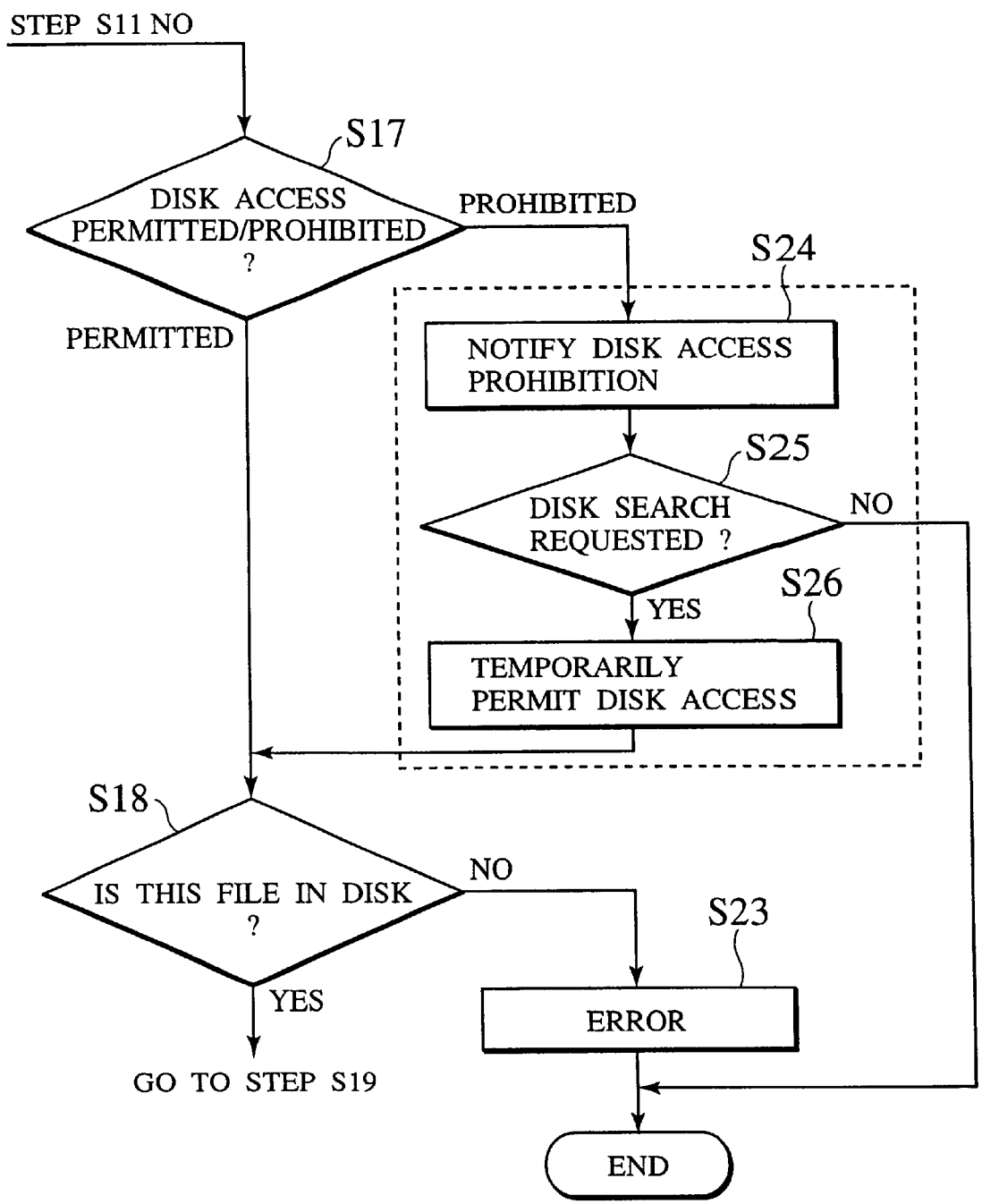
FIG. 5 is a flow chart showing one exemplary procedure of a file reading processing to be carried out by a file system of the portable information processing terminal device of FIG. 1.

In FIG. 5, the steps S24 to S26 are added to the processing procedure of FIG. 4, and the processing of these steps S24 to S26 is carried out after it is judged as in the disk access prohibited state at the step S17 of FIG. 4.

Namely, in the case where it is Judged as in the disk access prohibited state at the step S17, the file management unit 102 makes an inquiry to the user by a query "The device is currently in the disk access state. Do you wish to search through the disk by changing the state to the disk access permitted state?". When the user's response is "No (Do not search)" (step S25 NO), the processing is terminated. On the other hand, when the user's response is "Yes (Do search)" (step S25 YES), the file management unit 102 changes the state to the disk access permitted state by making the power supply judgement unit 103 to temporarily judge that "there is a possibility of external power supply" (step S26), and checks whether the corresponding file exists in the disk device 16 or not by searching through the disk (step S18). Note that the it suffices to permit the disk access only temporarily and the state may be set back to the disk access prohibited state after the file reading.

This file reading processing will be executed not only at a time of the activation of an application of the portable information processing terminal device 10 but also similarly with respect to library files and setting files that are read out in conjunction with the application activation, as well as processing target data files that will be reading requested from the application.

Reading from Network

Next, the reading processing in the case where the portable information processing terminal device 10 provides a desir ile to another ormation processing device by being operated in coordination with that information processing device via a LAN or the like will be described.

In the case where the portable information processing terminal device 10 is in a communication state with respect to another information processing device via a LAN, the power supply judgement unit 103 judges that there is a possibility of external power supply as mentioned above, so that the portable information processing terminal device 10 is set in the disk access permitted state.

Upon receiving the file reading request from that information processing device in the communication state, the OS of the portable information processing terminal device 10 searches out and reads out the requested file from the file system 18, and transfers it to that information processing device. At this point, the file reading processing similar to that of FIG. 4 is carried out by the file system 18.

Namely, the file management unit 102 searches through the cache 17 by referring to the cache management table first, and when this file is in the cache 17 this file is read out from the cache 17. At this point, in addition, it is also possible to carry out the comparison with the original file in the disk device 16 by using the update information in the cache management table and then carry out the write back processing if the file in the cache 17 is updated.

In the case where the reading requested file cannot be found in the cache 17, the file management unit 102 further searches through the disk device 16. When this file is found in the disk device 16, the file management unit 102 reads out that file from the disk device 16. In this case, the attribute information of that file is checked, and when it is a file that should be stored into the cache 17, the vacant capacity of the cache 17 is checked further. When there is a sufficient vacant capacity for storing that file, a copy of the file is stored into the cache 17. Even in the case where a vacant capacity is insufficient, this file can be stored after securing a sufficient vacant space by searching out and deleting files that are not accessed recently or the like. Finally, the file management unit 102 updates relevant fields (storing location, update information, last access time, etc.) of the cache management table according to the need (step S16). In the case where this file cannot be found in the disk device 16, the file management unit 102 returns an error.

Creation of New File on the Portable Information Processing Terminal Device

Figure 6:
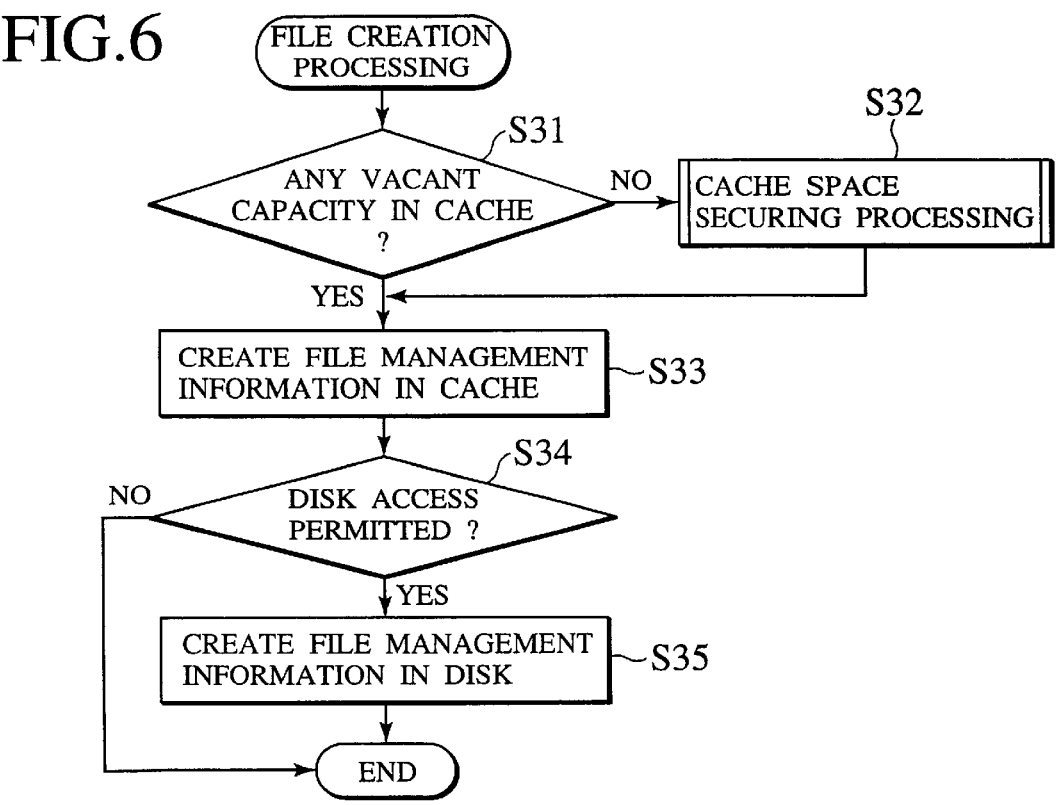
FIG. 6 is a flow chart showing a procedure for a new file creation processing to be carried out by a file system of the portable information processing terminal device of FIG. 1.

Next, with reference to FIG. 6, the procedure for a new file creation processing will be described.

When a new file creation request is issued from an application or the like executed on the portable information processing terminal device 10, the file management unit 102 first checks the vacant capacity of the cache 17 and Judges whether there is an enough vacant space or not (step S31). If there is an enough vacant space, the file management unit 102 adds an entry for a new file in the cache management table, and creates a management information (a file name, a storing location, an update information, a fie creation time, an access mode information, etc.) in there (step S33). If there is not an enough vacant space, the cache space securing processing is carried out (step S32) and then the management information for the new file is created (step S33).

Next, the file management unit 102 judges whether it is in the disk access permitted state or not (step S34), and if it is in the disk access permitted state, the file management unit 102 updates the file management table on the disk device 16 and creates the management information for the new file in there (step S35). The management information to be created on the disk device 16 is the same as that handled by the ordinary file system and comprises information such as a file name, a file storing location on the disk device 16, a file creation time, and access mode. If it is in the disk access prohibited state, the processing is terminated without creating the management information on the disk device 16.

Cache Space Securing Processing

Figure 7:
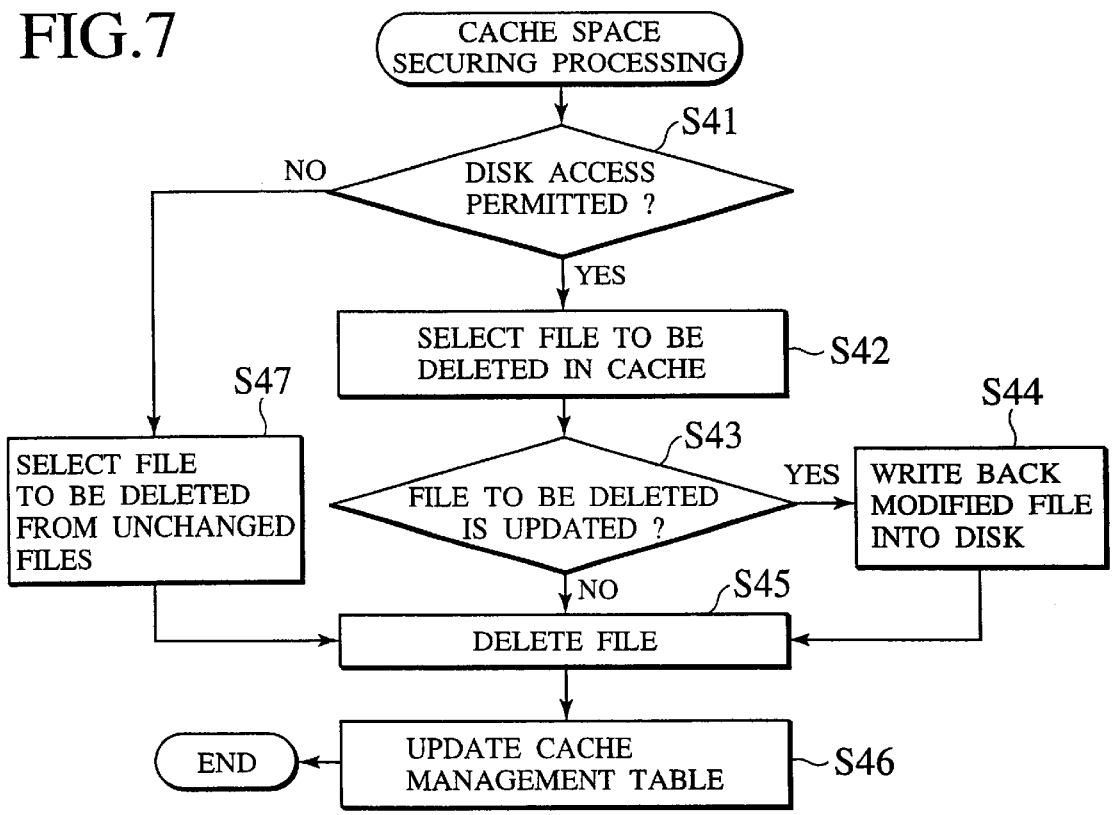
FIG. 7 is a flow chart showing a procedure for a cache space securing processing to be carried out by a file system of the portable information processing terminal device of FIG. 1.

Now, with reference to FIG. 7, the cache space securing processing of the step S32 will be described.

First, the file management unit 102 checks whether it is in the disk access permitted state or the disk access prohibited state (step S41). If it is in the disk access prohibited state, the file management unit 102 selects a file that is not updated among files already stored in the cache 17 and for which the same file exists on the disk device 16 (the update information="unchanged", as a deletion target file (step S47), and delete this file from the cache 17 (step S45). In the case where there are many files with the update information= "unchanged", a file with an older last access time or a file with a lower priority level which has a lower necessity for being stored in the cache 17 (such as a file that cannot be executed on the portable information processing terminal device 10) will be selected as the deletion target file at higher priority.

On the other hand, if it is in the disk access permitted state, the file management unit 102 selects a file with an older last access time or a file with a lower priority level which has a lower necessity for being stored in the cache 17 among files already stored in the cache 17, as the deletion target file at higher priority (step S42). Then, the file management unit 102 judges whether the selected deletion target file is updated or not (step S43), and if it is not updated (step S43 NO), deletes that file from the cache 17 immediately (step S45). If it is updated (step S43 YES), the write back to the disk device 16 is carried out (step S44) and then this file is deleted (step S45).

Finally, the file management unit 102 updates the cache management table and terminates the processing (step S46).

Note that the cache space securing processing described above will also be carried out at a time of data writing according to the need. Namely, in the case of writing data into the created file, the file size will increase every time the writing is done, and there can be cases where the vacant capacity of the cache 17 is used up in a middle of the writing. In such a case, the writing processing is interrupted temporarily, and then the writing processing is resumed after the space is secured by deleting files from the cache 17 according to the above described procedure.

Writing on the Portable Information Processing Terminal Device

Figure 8:
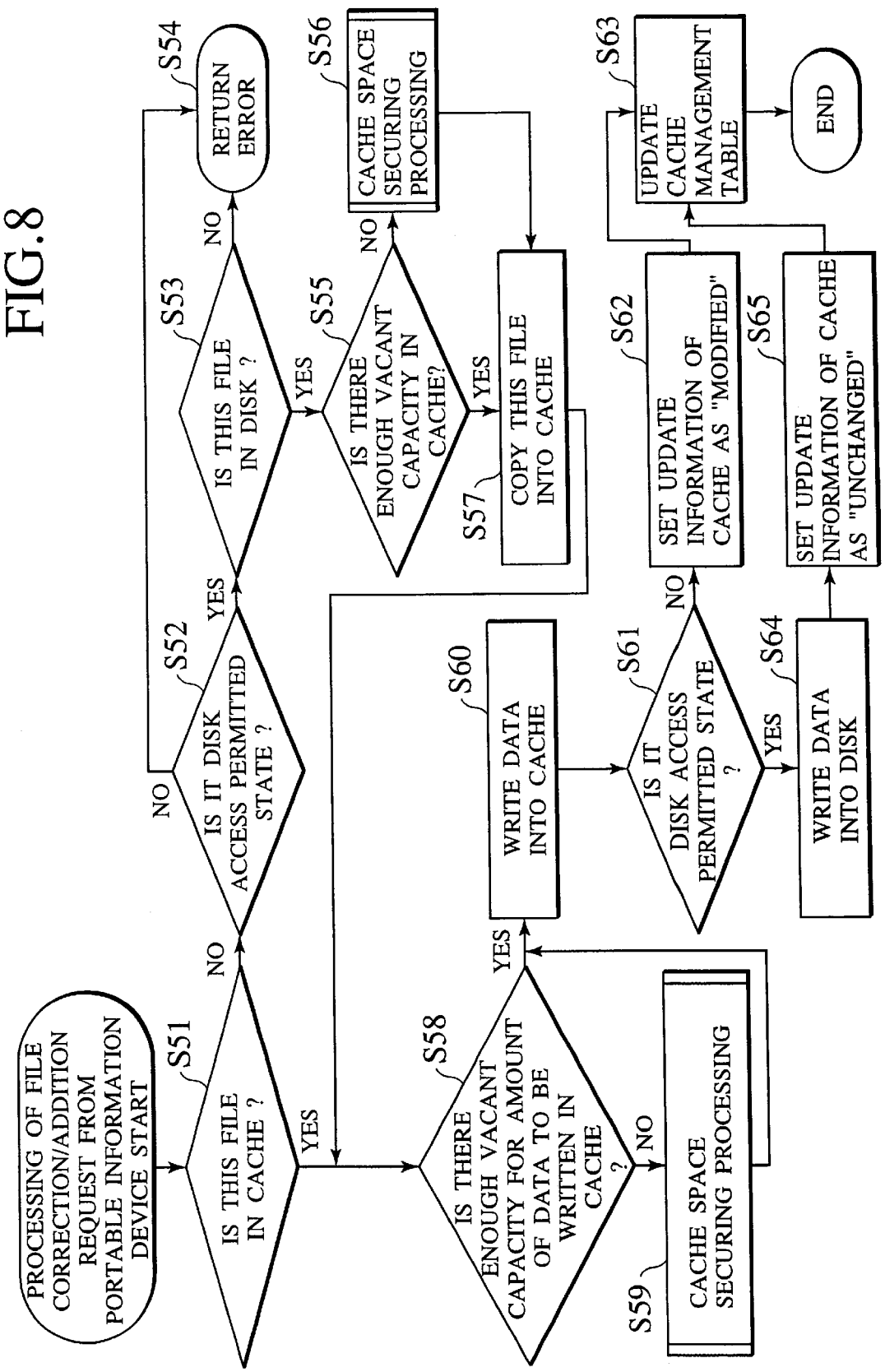
FIG. 8 is a flow chart showing a procedure for a file correction/addition data writing processing to be carried out by a file system of the portable information processing terminal device of FIG. 1.

Next, with reference to FIG. 8, the data writing processing with respect to a request for data correction/addition within a file issued in the portable information processing terminal device 10 will be described.

When a request for data correction or addition with respect to a file already existing in the file system 18 is issued from an application or the like executed on the portable information processing terminal device 10 (as well as in the case of writing data after creating the management information for a new file), the file management unit 12 first checks whether the file specified by the data correction/addition request exists in the cache 17 or not (step S51).

If the file does not exist in the cache 17, the file management unit 102 judges whether it is in the disk access permitted state or not (step S52), and if it is in the disk access permitted state, the file management unit 102 further checks whether the corresponding file exists in the disk device 16 or not (step S53). If the disk access is prohibited (step S52 NO) or if the corresponding file does not exist in the disk device 16 (step S53 NO), the file management unit 102 returns an error to the requesting application or user (step S54), and terminates the processing. Of course, it is also possible to carry out the inquiry to the user and change the state to the disk access permitted state temporarily by the procedure similar to that of FIG. 5.

The data to be written by correction or addition are processed with respect to the file in the cache 17. For this reason, if the corresponding file exists in the disk device 16 (step S53 YES), the file management unit 102 checks whether there is an enough vacant capacity in the cache 17 or not (step S55), and if there is not an enough vacant capacity, the cache space securing processing is carried out (step S56) and then the corresponding file is copied from the disk device 16 to the cache 17 (step S57). Then, the data writing processing is carried out on the cache 17 by the following procedure, similarly as in the case where the writing specified file exists in the cache 17 (step S51 YES).

In the data writing processing, the file management unit 102 first judges whether there is an enough vacant capacity for the amount of data to be written in the cache 17 or not (step S58). If there is not an enough vacant capacity, the cache space securing processing is carried out (step S59) and the data writing into the cache 17 is carried out after securing the enough vacant capacity (step S60).

After that, the file management unit 2 judges whether it is in the disk access permitted state or not (step S61). If it is in the disk access prohibited state (step S61 NO), the file management unit 102 sets the update information of the corresponding file in the cache 17 as "modified" (step S62), updates the cache management table regarding the last access time or the like, and terminates the processing (step S63).

If it is in the disk access permitted state (step S61 YES), the file management unit 102 carries out the same data writing processing with respect to the original file in the disk device 16 as well (step S64). Then, the file management unit 102 sets the update information of the cache as "unchanged" (step S65), updates the cache management table regarding the last access time or the like, and terminates the processing (step S63).

New File Creation from Network

Figure 9:
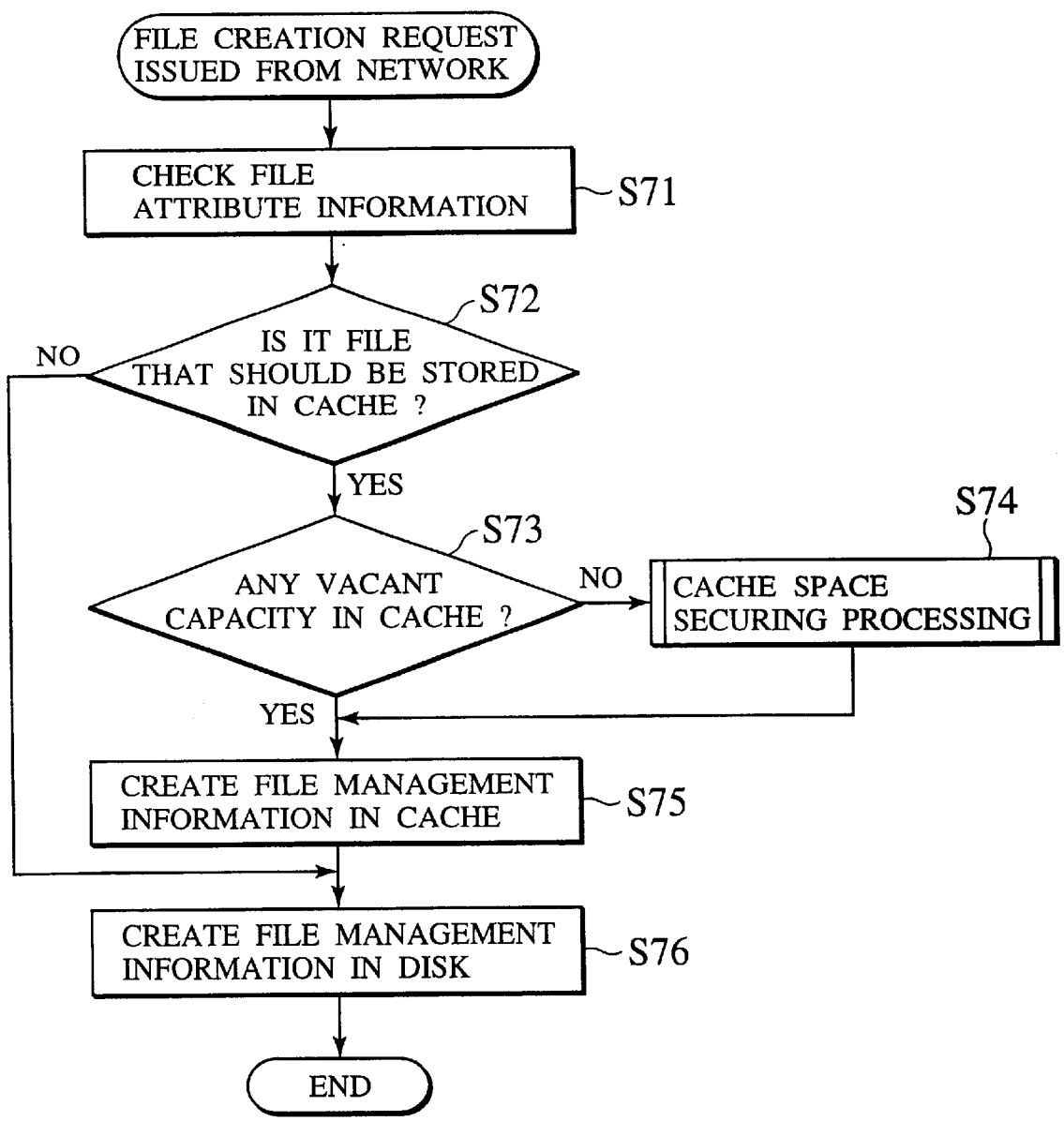
FIG. 9 is a flow chart showing a procedure of a file creating processing to be carried out by a file system the portable information processing terminal device of FIG. 1 upon receiving a file creation request through a network.

Next, with reference to FIG. 9, the processing in the case where the portable information processing terminal device 10 receives a new file creation request from another information processing device via a network such as LAN by being operated in coordination with that information processing device will be described.

As already mentioned above, in the case where the portable information processing terminal device 10 is connected to LAN, the power supply judgement unit 103 Judges that there is a possibility of external power supply, so that activation of the disk device 16 is not prohibited and the portable information processing terminal device 10 is set in the disk access permitted state. Also, unlike the case of the file creation request from an application or the like that is executed in the portable information processing terminal device 10, there can be cases where the file creation request from a network creates a file that cannot be executed/processed on the portable information processing terminal device 10.

For this reason, in the case of creating a new file in the portable information processing terminal device 10 in response to a request from another information processing device, the file management unit 102 first checks the attribute information (an extension and a file name, or other ID information indicating a file type, etc.) of that file which is attached to the creation request (step S71), and Judges whether it is a file that should be stored into the cache 17 or not (step S72). An application program file that is executable on the portable information processing terminal device 10 or a file that can be processed by that application has a high probability of being accessed in the disk access prohibited state during the battery driven mode so that such a file will be Judged as a file that should be stored into the cache 17. In the case where the Judgement cannot be made, it is also possible to inquire the user as to whether it is a file that should be stored into the cache 17 or not.

In the case where the received file creation request is for a file that should be stored into the cache 17 (step S72 YES), the file management unit 102 checks the vacant capacity of the cache 17, and judges whether there is an enough vacant capacity or not (step S73). If there is an enough vacant capacity, the file management unit 102 adds a n entry for a new file in the cache management table, and creates the management information (a file name, a file creation time, access mode information, etc.) in there (step S75). If there is not an enough vacant capacity, the cache space securing processing is carried out (step S74) and then the management information for a new file is created (step S75).

Next, the file management unit 102 updates the file management table on the disk device 16, and creates the management information for a new file in there as well (step S76). The management information to be created on the disk device 16 is the same as that handled by the ordinary file system as described above.

On the other hand, when the created requested file is not a file that should be stored into the cache 17 (step S72 NO), the file management unit 102 creates only the management information on the disk device 16, without creating the management information for a new file in the cache 17 (step S76).

Writing from Network

Figure 10:
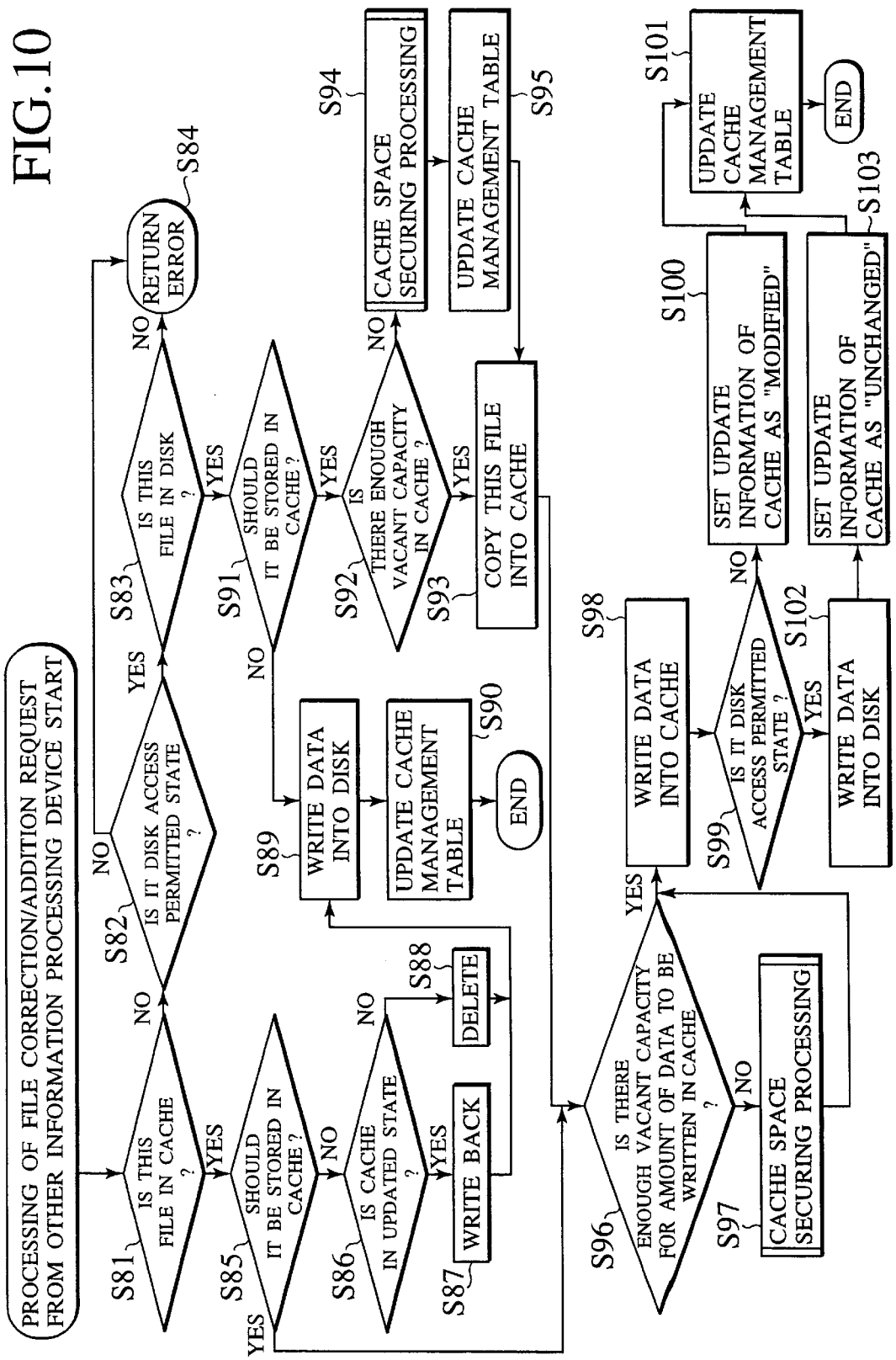
FIG. 10 is a flow chart showing a procedure of a data writing processing to be carried out by a file system the portable information processing terminal device of FIG. 1 upon receiving a file correction/addition request through a network.

Next, with reference to FIG. 10, the data writing processing with respect to a request for data correction/addition of a file issued from another external information processing device via a network such as LAN, that is to be executed by the portable information processing terminal device 10 by being operated in coordination with that information processing device, will be described.

When a request for data correction or addition with respect to a file already existing in the file system 18 is issued from the external information processing device (as well as in the case of writing data after creating the management information for a new file), the file management unit 12 first checks whether the specified file exists in the cache 17 or not (step S81).

If the file does not exist in the cache 17, the file management unit 102 judges whether it is in the disk access permitted state or not (step S82). In the case the portable information processing terminal device 10 is connected to a network via LAN, it is judged as in the disk access permitted state. In this case, the file management unit 102 checks whether the corresponding file exists in the disk device 16 or not (step S83). Even in the case of the network connection, there can be some special cases where the disk access is prohibited as in the case where the portable information processing terminal device 10 is connected to a network by a dial-up connection and operated by the battery, for example. In such a case where the disk access is prohibited (step S82 NO) or in the case where the disk access is permitted but the corresponding file does not exist in the disk device 16 (step S83 NO), the file management unit 102 returns an error to the requesting external information processing device or a user of the portable information processing terminal device 10 (step S84), and terminates the processing. Of course, it is also possible to carry out the inquiry to the user and change the state to the disk access permitted state temporarily by the procedure similar to that of FIG. 5.

In the case where the corresponding file exists in the disk device 16 (step S83 YES), the file management unit 102 acquires the attribute information of that file, and judges whether it is a file that should be stored into the cache 17 or not (step S91). If it is a file that should be stored into the cache 17 (step S91 YES), the file management unit 102 checks whether there is an enough vacant capacity in the cache 17 or not (step S92), and if there is not an enough vacant capacity, the cache space securing processing is carried out (step S94) and the cache management table is updated according to the content of the cache space securing processing (step S95), and then the corresponding file is copied from the disk device 16 to the cache 17 (step S93). Then, the procedure proceeds to the processing from the step S96 on as described below, where the data writing processing is carried out on the cache 17.

If it is not a file that should be stored into the cache (step S91 NO), the file management unit 102 carries out the data writing processing with respect to the corresponding file on the disk device 16 (step S89).

On the other hand, in the case where the writing specified file already exists in the cache 17 (step S81 YES), the file management unit 102 acquires the attribute information of that file and judges whether it is a file that should be stored into the cache 17 or not (step S85).

If it is a file that should be stored into the cache 17 (step S85 YES), the procedure proceeds to the processing from the step S96 on as described below, where the data writing processing is carried out on the cache 17.

If it is not a file that should be stored into the cache 17 (step S85 NO), the file management unit 102 checks whether it is updated data or not by referring to the cache management table (step S86). In the case where it is updated data, the write back to the disk device 16 is carried out if necessary (step S87), and it can be deleted from the cache 17 (step S88). After this processing, the data writing processing for data correction/addition is carried out only with respect to the file on the disk device 16 (step S89), the cache management table is updated according to the need (step S90), and the processing is terminated. If it is data of the file in the cache 17 that is not updated, this file is deleted from the cache 17 (step S88) and the data writing processing with respect to the disk device 16 is carried out (step S89).

The data writing processing on the cache 17 is carried out by the following procedure.

Namely, the file management unit 102 first judges whether there is an enough vacant capacity for the amount of data to be written in the cache 17 or not (step S96). If there is not an enough vacant capacity, the cache space securing processing is carried out (step S97) and the data writing into the cache 17 is carried out after securing the enough vacant capacity (step S98).

After that, the file management unit 2 judges whether it is in the disk access permitted state or not (step S99). If it is in the disk access prohibited state (step S99 NO), the file management unit 102 sets the update information of the corresponding file in the cache 17 as "modified" (step S100), updates the cache management table regarding the last access time or the like, and terminates the processing (step S101).

If it is in the disk access permitted state (step S99 YES), the file management unit 102 carries out the same data writing processing with respect to the original file in the disk device 16 as well (step S102). Then, the file management unit 102 sets the update information of the cache as "unchanged" (step S103), updates the cache management table regarding the last access time or the like, and terminates the processing (step S101).

Timing for Cache Write Back

It is important to write back those files in the cache 17 that are updated in the disk access prohibited state into the disk device 16 at appropriate timing, in anticipation of an accident where the remaining battery power becomes zero so that the data in the volatile memory can be lost. Also, there is a severe limitation on the capacity of the cache 17 so that it is preferable to carry out the write back to the disk device 16 at appropriate timing even in the case of using the non-volatile semiconductor memory as the cache 17.

The timing for the write back of the updated file in the cache 17 into the disk device 16 can be any of the following, for example: (1) the write back is carried out at a timing of a transition from the disk access prohibited state to the disk access permitted state; (2) the write back is carried out at a timing where the external power supply starts, even in the case where the state remains in the disk access prohibited state by the user command, for example, by temporarily setting the state to the disk access permitted state and then setting the state back to the disk access prohibited state after the write back is finished; (3) the write back is carried out automatically at a timing where the remaining battery power becomes lower than a prescribed amount in the state of having no external power supply; and (4) the write back is carried out at a timing commanded by the user after inquiring the user as to whether the write back is to be carried out or not. It is also possible to provide an input device for the write back command such that the user can command the write back at arbitrary timing, and the write back is carried out whenever it is commanded.

Figure 11:
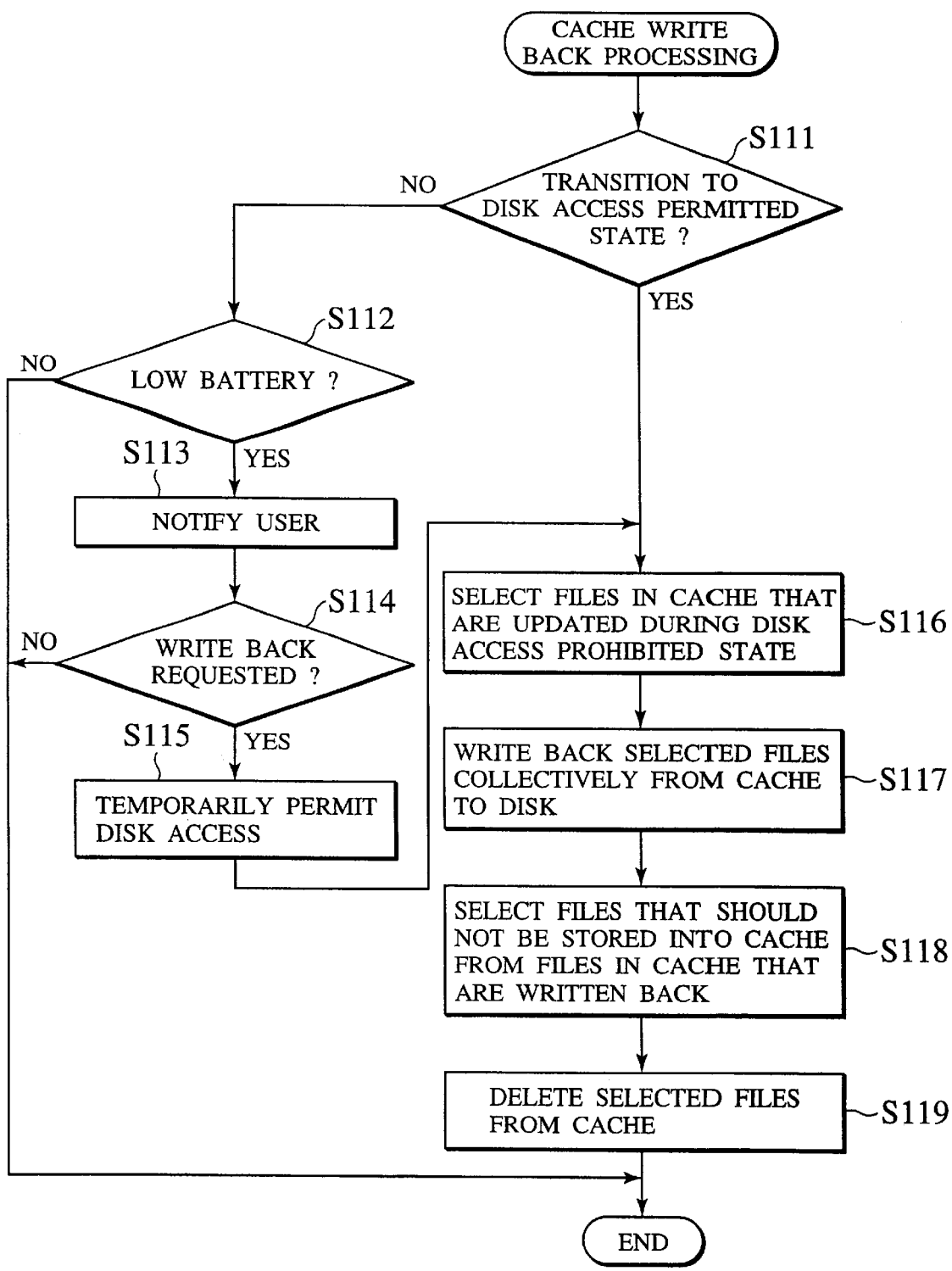
FIG. 11 is a flow chart showing a procedure of a cache write back processing to be carried out by a file system the portable information processing terminal device of FIG. 1.

In the following, with reference to FIG. 11, a concrete example of the processing procedure for the write back from the cache 17 to the disk device 16 will be described.

When the Judgement by the power supply judgement unit 103 is changed from "there is no possibility of external power supply" to "there is a possibility of external supply" because of the connection of the external AC power source, the LAN connection, etc., the prohibition of activation of the disk device 16 by the disk activation prohibition unit 104 is released so that the state is switched from the disk access prohibited state to the disk access permitted state. In the case where a transition from the disk access prohibited state to the disk access permitted state occurs as such (step S111 YES), the file management unit 102 first selects all files that are updated during a period of the disk access prohibited state from files in the cache 17 by referring to the cache management table (step S116), and carries out the processing to write these selected files collectively back from the cache 17 to the disk device 16 (step S117).

Then, the file management unit 102 selects those files which should not be stored in the cache 17 among these files according to the file attribute information of each file that is written back (step S118). In this case, files such as the application program files/data files that cannot be executed/processed on the portable information processing terminal device 10 and those files that are specified as unnecessary to cache by the user are selected as files that should not be stored in the cache 17. After that, the file management unit 102 deletes the selected files from the cache 17 (step S119) and terminates the processing.

On the other hand, during a period of the disk access prohibited state, the file management unit 102 regularly checks the remaining power of the battery through the power supply judgement unit 103 and judges whether it is a state in which the remaining power of the battery is lower than a prescribed value (low battery state) or not (step S112). When it is detected as the low battery state (step S112 YES), the file management unit 102 notifies this fact to the user and inquires the user as to whether the write back is to be carried out or not (steps S113, S114). When the execution of the write back is commanded from the user (step S114 YES), the file management unit 102 temporarily sets the state to the disk access permitted state by making the power supply judgement unit 103 to temporarily judge that there is a possibility of external power supply (step S115). After that, the file management unit 102 carries out the processing of the steps S116 to S119 as described above, and terminates the processing after returning the state back to the disk access prohibited state.

File Hoarding into Cache

Next, the processing for hoarding files from the disk device 16 to the cache 17 which is to be carried out during a period of the disk access permitted state in preparation to a transition to the disk access prohibited state will be described.

In order to maximize the utilizability of the portable information processing terminal device 10 even during a period of the disk access prohibited state, it is important to store those files that have a high possibility of being accessed during this period into the cache 17 as much as possible. For this reason, in this embodiment, in addition to the cache control by which those files that are read out from the disk device 16 in response to the file reading requests are stored into the cache 17 according to the need, the hoarding processing for actively selecting files that should be stored into the cache 17 from the disk device 16 and reading copies of these selected files into the cache 17 in advance will be carried out.

In the following, with reference to FIG. 12, an exemplary procedure for the hoarding processing will be described.

The file management unit regularly checks whether it is in the disk access permitted state or the disk access prohibited state (step S121). If it is in the disk access permitted state, the file management unit 102 checks the file attribute information of each one of a plurality of files stored in the disk device 16 to judge whether it should be selected a file that should be read into the cache 17 in advance or not, so as to select files with higher priority levels among those files that are not yet copied to the cache 17 from a group of files in the disk device 16 (step S122). Then, the file management unit 102 copies the selected files collectively from the disk device 16 to the cache 17 (step S123).

Note that the file selection processing of the step S122 can be carried out without actually accessing the disk device 16 by storing the management information for all of the plurality of files stored in the disk device 16 into the cache management table of a prescribed region in the cache 17. Consequently, in this case, it is possible to carry out the file selection processing during a period of the disk access prohibited state, and carry out only the processing to copy from the disk device 16 to the cache 17 after the disk access prohibited state is released.

The timing for carrying out the hoarding processing can be any of the following.

For example, the file management unit 102 checks the vacant capacity of the cache 17 at a constant time interval, and if there is a vacancy, those files with higher priority levels that are not yet copied to the cache 17 are searched from the disk device 16 and copied into the cache 17. Here, however, there is no guarantee that the power of the portable information processing terminal device 10 is always turned on, so that this processing may be delayed until the power is turned on next if the power is not on at a timing of a start of the copying. Also, this processing may be delayed until there is external power supply next if it is in the battery driven mode at a timing of a start of the copying.

It is also possible to start the hoarding processing by using a transition of the power supply state or the communication state in the portable information processing terminal device 10 as a trigger, rather than at a constant time interval. For example, it can be carried out at a timing of turning the power on, a timing of transition from the battery driven mode to the external AC driven mode, a timing of a start of communications with another information processing device, etc.

Also, in the case where there is not an enough vacant capacity in the cache 17 when the copying is attempted, it is possible to compare the priority levels of files that are only stored in the disk device 16 and not in the cache 17 with the priority levels of files already stored in the cache 17, and if the priority level of a file stored in the cache 17 is lower, this file can be deleted and a file with a higher priority level that is stored in the disk device 16 can be copied. Note that at this point, the write back to the disk device 16 will be carried out if a file with a lower priority level in the cache 17 is updated.

As described, in this embodiment, it is possible to realize both a low power consumption and a large memory capacity by the function of the file system 18, so that it becomes possible to provide a sufficient data memory capacity without hampering the portability.

In addition, the file system 18 is a computer program so that the file system 18 can be recorded into a computer readable recording medium such that it can be introduced and utilized into an ordinary information processing device through recording media or communication media. Consequently, the effects similar to those of this embodiment can be easily obtained by an information processing device having a memory and a disk device that can be used in storing files, by simply introducing the present file system 18.

Note that the above described embodiment is mainly directed to the case where copies of files selected from the disk device 16 are generated in the secondary memory 17 such that the secondary memory 17 is used as a cache for the disk device 16, but it is also possible to store different files in the disk device 16 and the secondary memory 17. In such a case, both the disk device 16 and the secondary memory 17 will function as secondary storages in terms of the storage hierarchy.

It is also possible to allocate a part of the memory region of the main memory 12 as RAM disk or the like and use that region as the cache, or use a storage medium such as a memory card that can be mounted onto the portable information processing terminal device 10 in a freely detachable manner as the cache.

Also, the disk device 16 is not necessarily limited to the hard disk drive and a magneto-optic disk drive device or a phase shift type optical disk drive can be utilized as the disk device 16.

As described, according to the present invention, it becomes possible to realize both a low power consumption and a large memory capacity, so that it becomes possible to provide a sufficient data memory capacity without hampering the portability of the portable information processing terminal device 10. In particular, by reading those files that are predicted to have higher probabilities for being used during a period in which activation of the disk device is prohibited, from the disk device to the memory in advance, it becomes possible to increase the utilizability of the portable information processing terminal device so that the user can carry out works even during a period in which activation of the disk device is prohibited, without any trouble.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the portable information processing terminal device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A computer implemented method for managing files of an information processing terminal device having a first memory for storing files and a second memory for storing a plurality of files, the second memory having a larger memory capacity and a higher power consumption than the first memory, comprising the steps of:

judging whether there is a possibility of external power supply or not;

prohibiting activation of the second memory upon judging that there is no possibility of external power supply; and selecting prescribed files that are expected to have probabilities for being accessed during a period in which activation of the second memory is prohibited, and storing the prescribed files into the first memory in advance.

* * * * *